April 8, 1958     F. WILLIAMS     2,829,577
DISC PLOUGHS

Filed Dec. 20, 1954     3 Sheets-Sheet 1

Inventor
Frederick Williams
By
Attorneys

April 8, 1958     F. WILLIAMS     2,829,577
DISC PLOUGHS
Filed Dec. 20, 1954     3 Sheets-Sheet 2
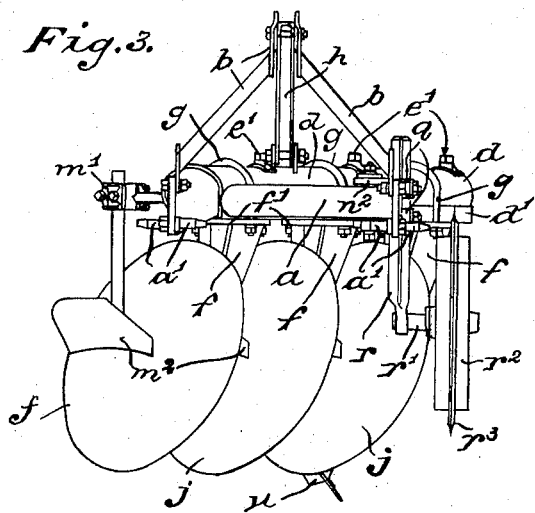
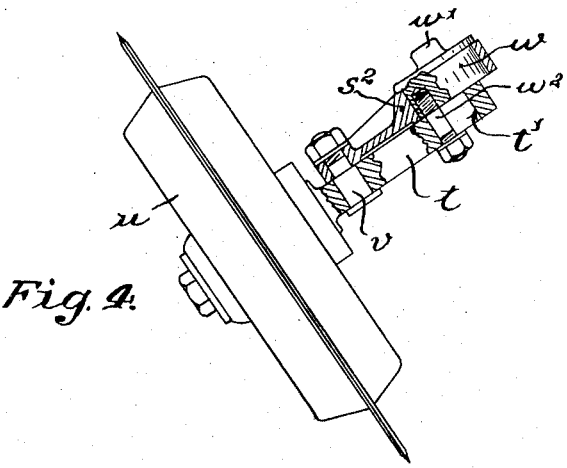
Inventor
Frederick Williams
By Morris L. Bateman
Attorneys

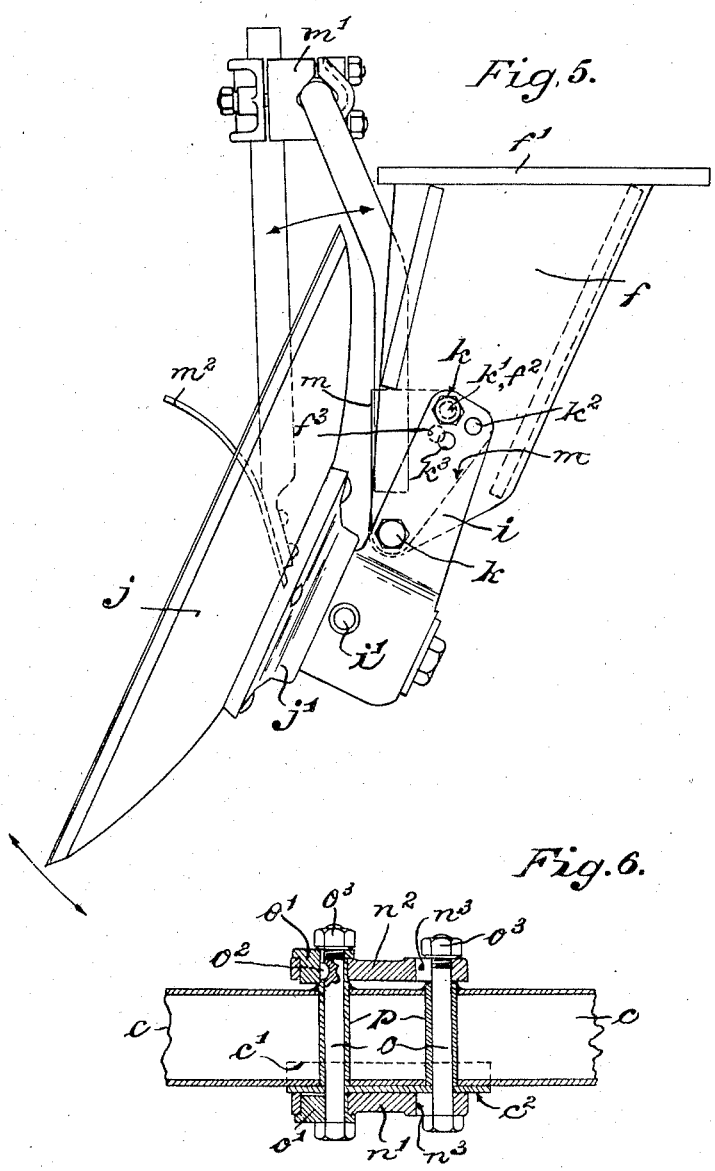

United States Patent Office 2,829,577  
Patented Apr. 8, 1958

2,829,577
DISC PLOUGHS

Frederick Williams, Meltham, Huddersfield, England, assignor to David Brown Tractors (Engineering) Limited Application December 20, 1954, Serial No. 476,403

Claims priority, application Great Britain December 28, 1953

3 Claims. (Cl. 97—53)

The invention relates to disc ploughs of what are known as mounted type, that is to say capable of being hitched to the rear of a tractor by means, preferably, of a 3-link hitch comprising two lower, laterally-spaced links and a central, upper link, all three links being pivotally connected at their front ends to the tractor and at their rear ends to the implement frame, and the lower links being connected by lift rods to arms on a rock shaft on the tractor, operable by power means on the tractor to enable the implement to be bodily lowered into or raised out of operative position.

The invention has for its object to provide an improved mounted disc plough which will be capable of adaptation to suit a wide range of soil conditions, different furrow widths and so on, and which in particular will enable very hard soils such as are found in tropical countries to be ploughed more successfully than has hitherto been possible with a plough of the type concerned.

The improved plough is characterised by the combination of a frame having means for attachment of the plough to a tractor; a series of plough discs mounted on the main frame member by means of hanger brackets each of which brackets is angularly adjustable, along with its respective disc, in a substantially horizontal plane, and each such disc being further angularly adjustable relative to its hanger bracket in a substantially vertical plane including its axis; a peripherally flanged depth wheel vertically adjustable relative to the implement frame and also angularly adjutable about a substantially vertical axis to counteract part of the side thrust on the plough; and a rear mounted thrust wheel inclined at a suitable thrust angle so as to run against the furrow wall made by the rear plough disc, and adjustable to permit of variable angular positioning of its axis relative to the implement frame as seen in plan view of the plough.

Figure 1:
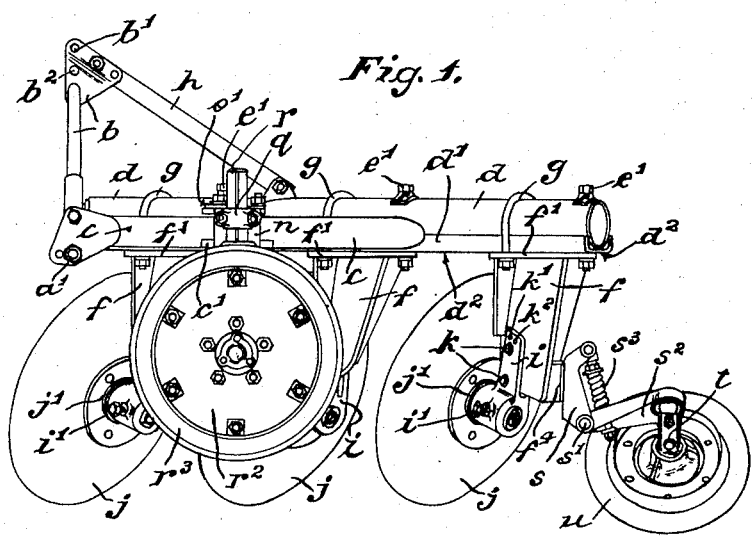
Figure 2:
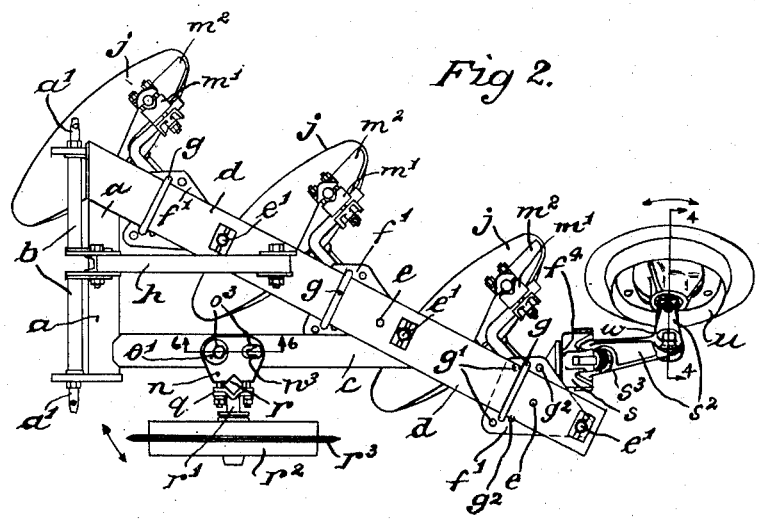

Other desirable features of the preferred embodiment of the invention will become apparent in the following description thereof and in the accompanying drawings, of which Figs. 1, 2 and 3 are respectively a side elevation, plan view and front elevation of the improved plough; Fig. 4 is a section, on the line 4—4 in Fig. 2, through the thrust wheel adjusting means; Fig. 5 is an elevation of a disc, hanger bracket and scraper assembly; and Fig. 6 is a section, on the line 6—6 in Fig. 2, through the means provided for making angular adjustment to the depth wheel.

The preferred form of plough according to the invention comprises a transverse frame member $a$ having a hitch pin $a^1$ at each end for attachment to the lower links of a tractor 3-link hitch and carrying a headstock $b$ provided at $b^1$ with two aligned holes for locating a hitch pin for the top link of the tractor hitch means. Double-ended pins $a^1$ having one end of suitably larger diameter and length than the other, and reversible on the frame member $a$, are preferably provided as shown, together with two alternative aligned holes at $b^2$, of greater diameter and lateral spacing than those at $b^1$, in the headstock $b$. By these means the plough may be hitched to a tractor having linkage of British Standards Institute Category 1 or 2, as desired. It should be noted, however, that the invention is intended to include any type of tractor hitch means, not necessarily of the 3-link type, adapted for combination with mounted implements.

Extending horizontally rearwardly at a suitable angle from the frame member $a$, and braced thereto by a suitably disposed strut $c$, is a tool support or main frame member $d$ which is preferably of tubular form so that it may contain, if desired, a ballast weight or weights. The headstock $b$ is also braced to this member $d$ by a part $h$.

Spaced apart along the length of the main frame member $d$ are a number of locating points $e$, each comprising vertically aligned holes in the said frame member, for the attachment of a series of depending tool arms or brackets $f$, hereinafter referred to as hanger brackets, arranged to support the plough discs. The underside of the member $d$ has welded to it a channel member $d^1$ whereby as best seen in Fig. 1 a flat face $d^2$ is provided against which a flat-topped plate $f^1$ at the upper end of each hanger bracket $f$ may bear. Provision is made in the present instance for the reception of a maximum of three such hanger brackets, each of which is secured in position on the main frame member $d$ by a bolt $e^1$ passed through the appropriate locating point $e$ and through a hole in the rear of the plate $f^1$ on the bracket, and by a U-bolt $g$ the crown of which extends over and rests upon the member $d$ and the depending legs of which pass through suitably spaced holes towards the front end of the plate $f^1$. Figs. 1–3 show a three-disc plough with the hanger brackets arranged along the frame member $d$ in the wider of two spacing positions provided. When it is desired to employ the alternative narrower spacing the bolts $e^1$ are removed from the central and rear hanger brackets, the corresponding U-bolts $g$ are slackened, and the said brackets are slid forwardly along the member $d$ until the bolts $e^1$ can be reinserted through the locating points $e$ shown as not being in use in Fig. 2, the said bolts, and also the U-bolts, being then retightened. It will be obvious that in a three-disc plough the hanger brackets $f$ must always be equally spaced apart; also that the plough is easily convertible to a two-furrow or single-furrow type, according to requirements, by removal of one or two of the hanger brackets.

Angular adjustment of each hanger bracket $f$, along with its respective plough disc, is provided for about its bolt $e^1$, in the plane of the flat face $d^2$ against which its top-plate $f^1$ bears. This is best seen in Fig. 2, in which the hanger brackets are shown in the central one of three permissible angular positions relative to the main frame member $d$. Referring now to the plate $f^1$ of the rearmost hanger bracket, it will be seen that in addition to the pair of holes in which the U-bolt $g$ is shown as being secured, there are two other pairs of holes $g^1$ and $g^2$, the former at a slightly larger radius from the bolt $e^1$ than those shown as being in use, and the latter pair $g^2$ at a slightly smaller radius therefrom than those in use. The angular positions of the three pairs of holes thus provided towards the front end of the plate $f^1$, relative to the hole in which bolt $e^1$ engages, is such that engagement of the U-bolt $g$ with any pair thereof will vary the angular position of the hanger bracket $f$ and its plough disc relative to the implement frame in a horizontal plane. All three hanger brackets, and not only the rearmost one, are of course adjusted in this way.

Referring now to Figs. 1 and 5, the lower end of each hanger bracket $f$ has fixed to it by two bolts $k$, $k$ a bracket member $i$ incorporating a bored-out housing, extending at a suitable angle to the horizontal and in bearings in which the spindle of a plough disc $j$ of the usual concave form is mounted, said spindle and bearings being retained in position by two set-screws such as $i^1$, located one on each side of the spindle bearing housing. The closed end of this bearing housing, remote from the disc $j$, is provided with a grease nipple, and at the end adjacent the disc there is provided a grit-excluding ring of suitable material which makes a good joint between the outer surface of the housing and the interior surface of an annular flange $j^1$ extending rearwardly from the back of the disc $j$.

Also bolted to each hanger bracket $f$ by the bolts $k, k$ is a plate $m$ carrying suitably adjustable support means including a clamp $m^1$ for a disc scraper $m^2$. The member $i$ and plate $m$ are adjustable together about the lower bolt $k$ as best seen in Fig. 5, so as to vary the angle made by the plough disc axis with the horizontal and at the same time maintain the scraper $m^2$ in operative position relative to the disc $j$. To this end the member $i$ and plate $m$ are each provided with aligned holes at $k^1$, $k^2$, $k^3$ whose angular positions vary slightly relative to the lower bolt $k$, whilst the hanger bracket $f$ has a hole $f^2$, at the same radius from the lower bolt $k$ as the holes at $k^1$ and $k^2$, and a hole $f^3$ at the same radius therefrom as the holes at $k^3$. The upper bolt $k$ can thus be passed through holes $k^3$ and $f^3$ as shown in Fig. 1, holes $k^1$ and $f^2$ as shown in Fig. 5, or through holes $k^2$ and $f^2$, giving three angular positions of the disc $j$ relative to the hanger bracket $f$ in a vertical plane including the disc axis. In dry soil conditions, when scrapers $m^2$ may not be required, they are easily moved to inoperative position by adjustment of the clamps $m^1$, or equally easily removed altogether.

Suitably located upon the strut member $c$ of the plough frame is a short channel member $c^1$ welded thereto so as to provide a horizontal flat face $c^2$, see Fig. 6. Two small-diameter tubes $p, p$ suitably spaced apart lengthwise of the member $c$, and passing vertically through and welded to said member, are aligned with holes in the channel member $c^1$, whereby by means of bolts $o, o$ a U-shaped bracket $n$ is secured to the strut member $c$ with its lower arm $n^1$ bearing against the face $c^2$ and its upper arm $n^2$ just clear of the tops of the tubes $p, p$, which project slightly above the strut member. The crown of the bracket $n$ extends around and projects from the near side of the strut member $c$, and the said bracket is angularly adjustable on the strut in a horizontal plane by means of eccentric bushes $o^1, o^1$, the lower one of which is suitably fixed, as by welding, to the head of the forward bolt $o$ whilst the upper bush is keyed to the forward bolt at $o^2$. The rearward bolt $o$ engages in aligned slots $n^3$ in the arms of the bracket $n$ to permit of angular adjustment of the said bracket about the said rearward bolt, on rotation of the eccentrics $o^1, o^1$ by turning the forward bolt $o$ with a spanner. The bracket $n$ is fixed in adjusted position by tightening the nuts $o^3, o^3$, thereby locking the upper eccentric bush $o^1$, which projects below the arm $n^2$, against the projecting top of the forward tube $p$.

By means of clamps or cap members $q, q$ there is adjustably secured to the crown of the bracket $n$ a vertically extending stem or bar $r$ of non-circular section, the lower end of which carries a short horizontal spindle $r^1$ on which is rotatably mounted a land wheel or depth wheel $r^2$ adapted to run on the surface of the soil and thereby to determine the depth of penetration of the plough discs $j$. The bar $r$ is preferably provided with notches at suitable intervals along its length, the desired one of which is engaged with a projection on the bracket $n$ to maintain correct depth adjustment. It will be appreciated that the exact depth of ploughing will also depend on the angular setting of the discs $j$ relative to the hanger brackets $f$, that is to say the more vertical the discs the greater will be the depth ploughed.

The depth wheel $r^2$ is provided with an annular projecting fin or peripheral flange $r^3$ of suitably greater diameter than the wheel, such flange being adapted to cut into the soil and help to resist lateral deflection of the implement due to side thrust on the plough discs $j$. By appropriate adjustment of the eccentric bushes $o^1, o^1$ associated with its supporting bracket $n$, the angular disposition of the depth wheel $r^2$ can be adjusted as desired about a vertical axis to an optimum position for resisting said side thrust.

The rear hanger bracket $f$ is modified on its rear side to provide a mounting face $f^4$ for a thrust wheel supporting bracket $s$, see Figs. 1 and 2. Said face and supporting bracket are arranged in simple manner not shown to be relatively adjustably mounted by providing a choice of holes, in the bracket $s$, for the attachment bolts or studs, such that three vertical positions of the said bracket are obtainable. To the lower end of the bracket $s$ there is pivoted about a horizontal pin $s^1$ an L-shaped arm $s^2$, extending first rearwardly and then to the offside of the implement, between which and the upper end of the bracket $s$ there is confined a compression spring $s^3$ which acts to support yieldingly the arm $s^2$. Towards its rear end the latter is so fashioned that the part projecting to the offside makes a substantial angle with the horizontal, and thereby supports the axle $t$ of a peripherally flanged thrust wheel $u$ at a suitable fixed thrust angle to permit the said thrust wheel to run against the wall of the last-cut furrow.

The thrust wheel $u$ and axle $t$ are angularly adjustable on the arm $s^2$ in a plane including the thrust wheel axis and inclined to the horizontal at an angle equal to the thrust angle, so that the thrust wheel can always occupy the best position for counteracting the side thrust on the plough, the direction of which will of course vary according to the particular soil condition and to the adjustment of the plough discs $j$ in the horizontal plane. This angular adjustment of the thrust wheel also controls the width of cut of the front disc. The means provided for making such adjustment of the thrust wheel are shown in Fig. 4, the axle $t$ pivoting about a volt $v$ passing through it and through the extremity of the part of the arm $s^2$ projecting to the offside, and the adjustment being provided by a cylindrical member $w$ journalled in the "elbow" of the said arm. This member $w$ is rotatable by means of a square-section or other non-circular projection $w^1$ adapted to be turned by a spanner or the like, and carries an eccentric stud $w^2$ engaging in a slot $t^1$ in the axle member $t$. The thrust wheel and axle are locked in adjusted angular position by tightening the nuts on the bolt $v$ and stud $w^2$.

It will be obvious that an equivalent result may be obtained by having the thrust wheel angularly adjustable in a horizontal plane, or in any plane permitting angular positioning of its axis relative to the implement frame as seen in plan view.

The rear hanger bracket $f$ carrying the thrust wheel $u$ must of course always be employed whether ploughing three, two, or only one furrow; that is to say it must still be the rear hanger bracket in a two-disc plough, and the only hanger bracket in a single-disc plough.

Whilst the provision of eccentric members has been referred to for enabling the angular settings of the thrust wheel $u$ and depth wheel $r^2$ to be varied, and whilst alternative bolt-holes have been described as providing adjustment of brackets $f$, $i$ and $s$, it will be apparent that any suitable alternative adjusting means may be employed, whilst other features of the improved plough just described may be altered without departing from the scope of the present invention.

It will be seen that by the employment of one, two or more plough discs, and by appropriate selection of the spacing of the discs from one another if more than one are used, the number and width of the furrows cut can be selected according to the nature and condition of the soil. This power of selection, together with angular adjustment of the disc or discs in the horizontal and vertical planes and the permissible angular adjustments of the trust wheel and depth wheel respectively, enables any and every different soil condition to be catered for within the draft capacity of the tractor to which the implement is hitched. Correct setting of all the adjustments for a certain soil condition is clearly indicated by slackness at all times whilst ploughing is proceeding of the usual check chains provided on the lower links of the tractor hitch means to prevent undue lateral swinging of the implement, that is to say by the absence of any side thrust on the tractor.

What I claim is:

1. A plough comprising a tubular main frame member having a flat underside, a plough disc having a supporting spindle, a bearing bracket in which said spindle is journaled, a hanger bracket having a top plate engageable with the main frame member, a pivot bolt passing vertically through the main frame member and the top plate of the hanger bracket and about which the hanger bracket and plough disc can be swung in a horizontal plane, said top plate having pairs of holes spaced angularly about said pivot bolt, a U-bolt embracing the main frame member and having legs engageable in one or another pair of said pairs of holes for clamping the hanger bracket in different angularly adjusted positions on the main frame member, a horizontal pivot bolt passing through the lower portion of the hanger bracket and through the bearing bracket and about which the bearing bracket and plough disc can be swung in a vertical plane, the lower portion of the hanger bracket and the bearing bracket each having a set of holes spaced angularly about said horizontal pivot bolt, one or another of the set of holes in the bearing bracket being positioned to align with one of the set of holes in the hanger bracket when the hanger bracket is swung about said horizontal pivot, and a bolt adapted to be passed through such aligned holes of said sets for clamping the bearing bracket in angularly adjusted position relatively to the hanger bracket.

2. A plough comprising a tubular main frame member having a flat underside and plough discs mounted thereon, a U-shaped bracket member embracing a part of the main frame member and having upper and lower arms provided with aligned slots, a stem having means for securing it to said U-shaped bracket for vertical adjustment thereon and carrying a depth wheel, a vertical pivot bolt extending through the arms of said U-shaped bracket and connecting said bracket to the main frame member for angular adjustment of the depth wheel in a horizontal plane, a clamping bolt passing rotatably through the main frame member and aligned slots in the upper and lower arms of the U-shaped bracket, and eccentric bushings fixed to said clamping bolt and mounted rotatably in slots in the upper and lower arms of the U-shaped bracket and operative, by rotation thereof, to adjust said U-shaped bracket, stem and depth wheel angularly in a horizontal plane about said pivot bolt.

3. A plough comprising a main frame member, a hanger bracket mounted on said frame member and carrying a plough disc, a bracket member mounted resiliently on the hanger bracket, a thrust wheel having an axle member the axis of which is inclined to the horizontal at an angle equal to the thrust angle, a pivot bolt connecting said axle member to said resiliently mounted bracket member, one of said members having a cylindrical element journaled therein and carrying an eccentric stud and the other of said members having a slot in which said stud engages for relatively adjusting said members angularly about said pivot bolt in a plane which includes the axis of said axle member by rotation of said cylindrical element, and a clamping bolt connecting said axle member and bracket member for securing said members in such angularly adjusted relation.

References Cited in the file of this patent
UNITED STATES PATENTS

| | | |
|---|---|---|
| 185,383 | Billups | Dec. 19, 1876 |
| 795,430 | Danielsen | July 25, 1905 |
| 797,289 | Kennedy et al. | Aug. 15, 1905 |
| 963,295 | Jones | July 5, 1910 |
| 1,207,146 | Dickinson | Dec. 5, 1916 |
| 2,424,185 | Morkoski | July 15, 1947 |
| 2,456,465 | Strandlund | Dec. 14, 1948 |
| 2,704,496 | Taylor | Mar. 22, 1955 |